United States Patent [19]

Takeuchi et al.

[11] Patent Number: 4,524,264
[45] Date of Patent: Jun. 18, 1985

[54] TEMPERATURE CONTROL APPARATUS

[75] Inventors: Takashi Takeuchi; Hideaki Takahashi; Haruyoshi Kondo, all of Aichi, Japan

[73] Assignee: Kabushiki Kaisha Toyota Chuo Kenkyusho, Aichi, Japan

[21] Appl. No.: 493,698

[22] Filed: May 11, 1983

[30] Foreign Application Priority Data

May 13, 1982 [JP] Japan .................................. 57-79213

[51] Int. Cl.$^3$ ............................................. H05B 1/02
[52] U.S. Cl. ................................... 219/497; 219/492; 219/209; 364/482; 323/243
[58] Field of Search ............... 219/491, 492, 493, 497, 219/501, 209; 364/482, 483; 307/117; 323/243

[56] References Cited

U.S. PATENT DOCUMENTS

| | | | |
|---|---|---|---|
| 3,869,597 | 3/1975 | Strange | 219/497 |
| 3,901,437 | 8/1975 | Harkins | 219/492 |
| 4,114,024 | 9/1978 | Donner | 219/501 |
| 4,162,379 | 7/1979 | Sebens et al. | 219/501 |
| 4,187,525 | 2/1980 | Nagura et al. | 364/482 |
| 4,277,742 | 7/1981 | Kovac et al. | 219/209 |
| 4,290,431 | 9/1981 | Herbert et al. | 219/209 |
| 4,300,037 | 11/1981 | Padder | 219/492 |
| 4,367,399 | 1/1983 | Anthony et al. | 219/492 |

Primary Examiner—M. H. Paschall

[57] ABSTRACT

A temperature control apparatus detects an actual temperature of an object (e.g., sensor) to be controlled, and compares the actual temperature with a preset target temperature to obtain a difference therebetween, thereby keeping a heater temperature constant. The temperature control apparatus has a temperature rise rate limiter for controlling a temperature rise rate of the object to be controlled so as not to exceed a predetermined temperature rise rate. The object may thus not be damaged by thermal strain which results from a high temperature rise rate.

5 Claims, 5 Drawing Figures

TEMPERATURE CONTROL APPARATUS

BACKGROUND OF THE INVENTION

I. Field of the Invention

The present invention relates to a temperature control apparatus for maintaining an object such as a sensor or the like in an automobile engine at a predetermined constant temperature.

II. Description of the Prior Art

Conventionally, it is known in practice that a heater may be disposed to heat a sensor at a predetermined temperature so as to decrease an error in a detected output from the sensor when the detected output is temperature dependent. Among methods for heating the sensor, a method is proposed wherein a constant voltage is applied to the heating portion such as a heater. However, according to this method, since it takes a long period of time to heat the sensor to the predetermined temperature, the sensor cannot be immediately started. Furthermore, if a heat dissipation condition of the sensor is not good, the sensor becomes overheated. Conversely, if the sensor is exposed to an atmosphere where air blows strongly around the sensor, the sensor becomes overcooled, resulting in inconvenience. In order to solve these conventional drawbacks, another conventional method for heating the sensor is proposed as a constant temperature heating control method wherein a sensor temperature is detected and power is supplied to a heater so as to keep the sensor temperature constant in accordance with the detected sensor temperature. According to this method, the sensor temperature can be kept constant. However, a temperature rise rate may become too high, resulting in inconvenience. In particular, in order to perform constant temperature heating control by disposing a microheater on one major surface of a substrate and a gas sensor on the other major surface thereof, a method for controlling the sensor temperature is proposed wherein the heater comprises a material having a high resistance temperature coefficient, and a heater temperature is detected by an electric resistance of the heater without using a separate temperature sensor. This method has advantages in that temperature detection can be immediately performed, that the input power can be increased, and that the temperature rise rate can be high. However, according to the sensor described above, if the temperature rise rate is too high, the substrate may crack due to thermal strain. Furthermore, the heater and the gas sensor are degraded, thus presenting various problems.

SUMMARY OF THE INVENTION

The present invention has been made to solve these conventional problems, and has for its object to provide a temperature control apparatus wherein a sensor may be immediately heated to a target temperature at a considerably high temperature rise rate, and deterioration by thermal strain due to too high a temperature rise rate may be eliminated.

In order to achieve the above and other objects of the present invention, there is provided a temperature control apparatus comprising: temperature detecting means for detecting a temperature of an object to be controlled; temperature setting means for setting a target temperature of the object to be controlled; first comparing means for comparing an output signal from said temperature detecting means and an output signal from said temperature setting means and for producing an output signal corresponding to a difference between the output signal from said temperature detecting means and the output signal from said temperature setting means; controlling means for controlling power supplied to a heater in accordance with the difference, said heater being disposed on the object so as to perform temperature control; and temperature rise rate limiting means for limiting a temperature rise rate of the object to be controlled so as not to exceed an allowable temperature rise rate.

According to an aspect of the present invention, said temperature rise rate limiting means has: temperature rise rate detecting means for detecting a temperature rise rate; temperature rise rate setting means for setting an allowable temperature rise rate; second comparing means, connected to said temperature rise rate detecting means and said temperature rise rate setting means, for producing an output signal corresponding to a difference between output signals from said temperature rise rate detecting means and said temperature rise rate setting means; and selecting means for selecting a smaller one of the output signals from said first and second comparing means, whereby an actual temperature rise rate is controlled so as not to exceed the allowable temperature rise rate.

According to another aspect of the present invention, said temperature rise rate limiting means has: ramp rate setting means for setting a ramp rate defining a slope of a temperature rise; ramp function generating means for generating a predetermined function signal in accordance with the ramp rate set by said ramp rate setting means; and selecting means for selecting a smaller one of output signals from said first comparing means and said ramp function generating means, whereby an actual temperature rise rate is limited in accordance with power determined by the ramp function signal at an early stage of heater operation.

Other objects, features and advantages of the present invention will be apparent from the following detailed description when read with the accompanying drawings which show, by way of example and not limitation, apparatus for realizing the presently preferred embodiment of the present invention.

DETAILED DESCRIPTION OF THE PREFERRED EMBODIMENTS

Figure 1:
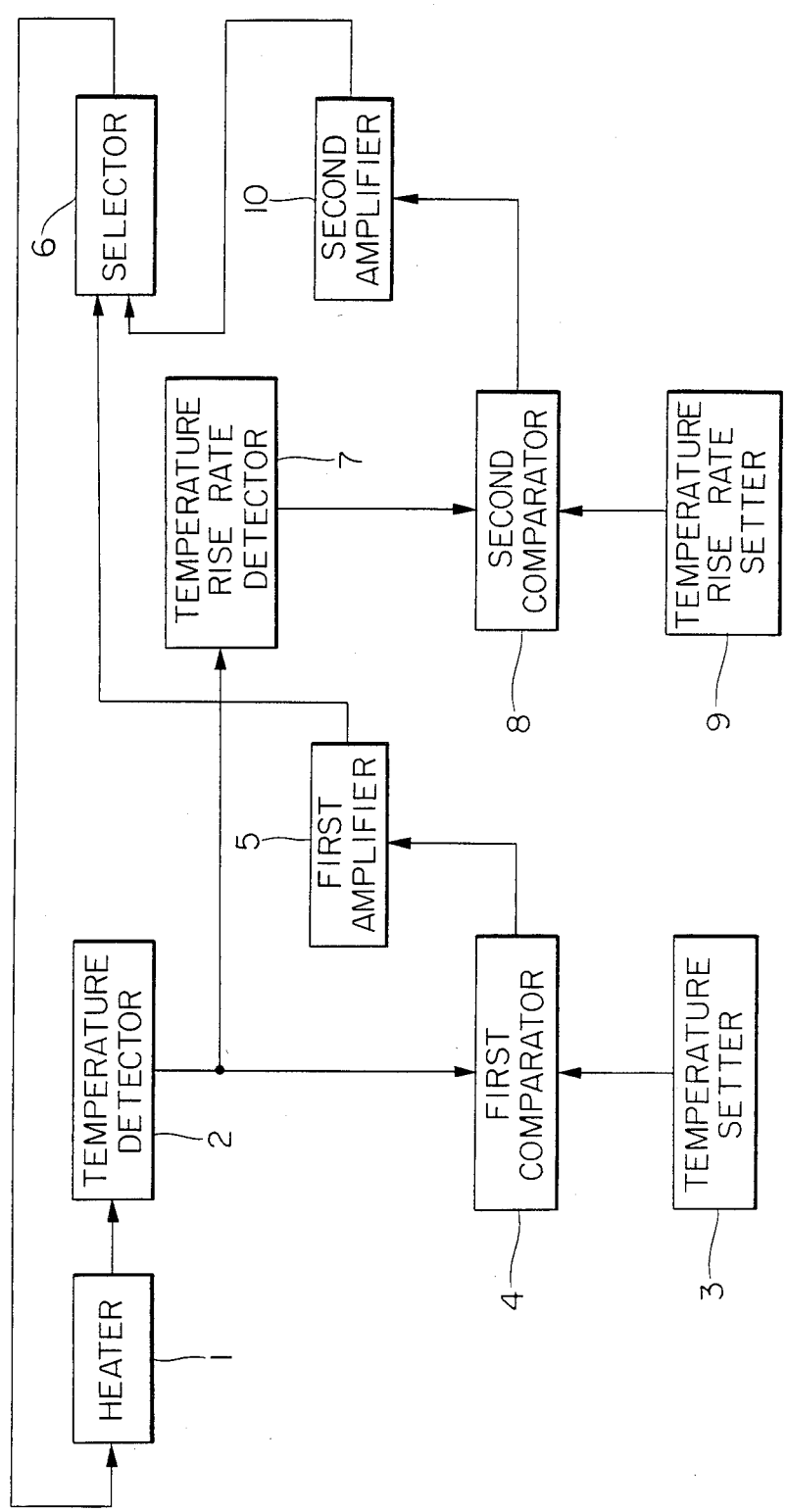
FIG. 1 is a schematic block diagram of a temperature control apparatus according to an embodiment of the present invention.

FIG. 1 is a schematic block diagram of a temperature control apparatus according to an embodiment of the present invention. An output signal from a temperature detector 2 and an output signal from a temperature setter 3 are supplied to a first comparator 4. The temperature detector 2 detects a temperature in accordance with an electric resistance of a heater 1 for heating a sensor. The temperature setter 3 presets a target temperature for a sensor temperature. The first comparator 4 compares the detected temperature signal and the preset temperature signal and produces an output signal corresponding to a difference therebetween. The output signal from the first comparator 4 is amplified by a first amplifier 5. The amplified signal is then supplied to a selector 6 for selecting a smaller one of the detected temperature and the preset temperature.

The detected temperature from the temperature detector 2 is also supplied to a temperature rise rate detector 7. The temperature rise rate detector 7 comprises, for example, a differentiator to detect a temperature rise rate. An output signal from the temperature rise rate detector 7 is then supplied to one input of a second comparator 8. A temperature rise rate setter 9 comprises, for example, a voltage divider connected to a constant voltage source. An allowable or target temperature rise rate is preset in the temperature rise rate setter 9. The preset temperature rise rate data is supplied to the other input of the second comparator 8. The second comparator 8 compares the detected temperature rise rate with the preset temperature rise rate and produces an output signal corresponding to a difference therebetween. This output signal is supplied to a second amplifier 10. The selector 6 compares the output signal from the first amplifier 5 and the output signal from the second amplifier 10 and selects a smaller one of them. The heating control of the heater is performed in accordance with the selected signal.

In the temperature control apparatus having the arrangement described above, since the actual temperature detected by the temperature detector 2 is significantly lower than the preset target temperature set by the temperature setter 3 in the early stage of heater operation, the first amplifier 5 produces a high output signal. As the heater is controlled in accordance with this high output signal, the temperature rise rate is increased. This temperature rise rate is detected by the temperature rise rate detector 7. The second comparator 8 compares the target temperature rise rate preset in the temperature rise rate setter 9 with the temperature rise rate detected by the temperature rise rate detector 7, and produces an output signal corresponding to a difference therebetween. However, since the actual temperature rise rate is abruptly increased in the early stage of heater operation, the output signal from the second comparator 8 comes close to zero. Furthermore, since the selector 6 selects a smaller one of the output signals from the first and second amplifiers 5 and 10, the selector selects the output signal from the second amplifier 10 when the detected temperature rise rate comes close to the preset temperature rise rate, so that the heater is controlled such that the actual temperature rise rate does not exceed the target temperature rise rate.

In this manner, even when the temperature rise rate increases, it is controlled not to exceed the target temperature rise rate.

When the heater temperature comes close to the preset temperature, the first amplifier 5 produces a low output signal, thereby controlling the heater temperature at the predetermined temperature.

Figure 2:
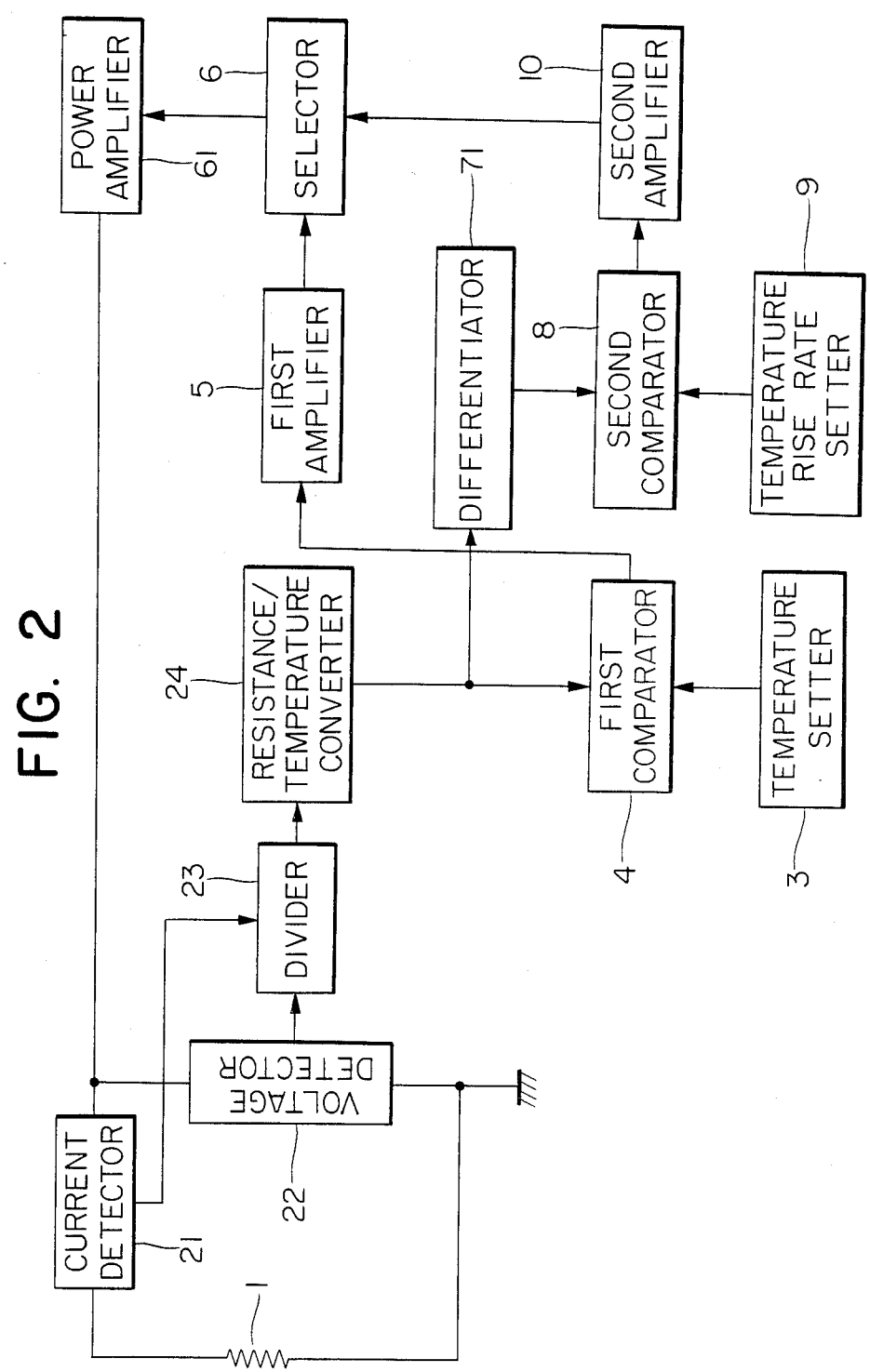
FIG. 2 is a detailed block diagram of the temperature control apparatus shown in FIG. 1.

FIG. 2 is a detailed block diagram of the temperature control apparatus shown in FIG. 1. An output signal (voltage or current) from the selector 6 is supplied to a power amplifier 61. An output signal from the power amplifier 61 is supplied to one end of the heater 1 through a current detector 21. The other end of the heater 1 is grounded. A voltage detector 22 is arranged between the output of the power amplifier 61 and ground. Output signals from the current detector 21 and the voltage detector 22 are supplied to a divider 23. An output signal from the divider 23 is then supplied to a resistance/temperature converter 24. An output from the resistance/temperature converter 24 is then supplied to the first comparator 4 and to a differentiator 71. Any other arrangement is the same as that shown in FIG. 1.

The operation of the circuit shown in FIG. 2 will be described. The electric resistance of the heater 1 is obtained by a ratio of a voltage applied thereto to a current I flowing therethrough. Therefore, when the signal corresponding to the voltage detected by the voltage detector 22 is divided by the signal corresponding to the current detected by the current detector 21 to obtain a quotient (ratio), the quotient corresponds to the electric resistance of the heater 1. Since the heater 1 comprises platinum (Pt), tungsten (W) or nickel (Ni), the electric resistance of the heater 1 linearly increases with an increase in temperature thereof. Therefore, the electric resistance of the heater 1 is temperature dependent. Without a separate temperature sensor (a thermocouple or temperature-sensitive resistor) being arranged, the heater temperature can thus be detected. The resistance/temperature converter 24 converts the electric resistance (or a corresponding voltage or current signal) of the heater 1 to a temperature (or a corresponding voltage or current signal). The power amplifier 61 amplifies the output signal (voltage or current) from the selector 6 and supplies to the heater 1 a voltage or current which is required to heat the heater 1 to the target temperature. It should be noted that any other arrangement is the same as the arrangement shown in FIG. 1.

Figure 3:
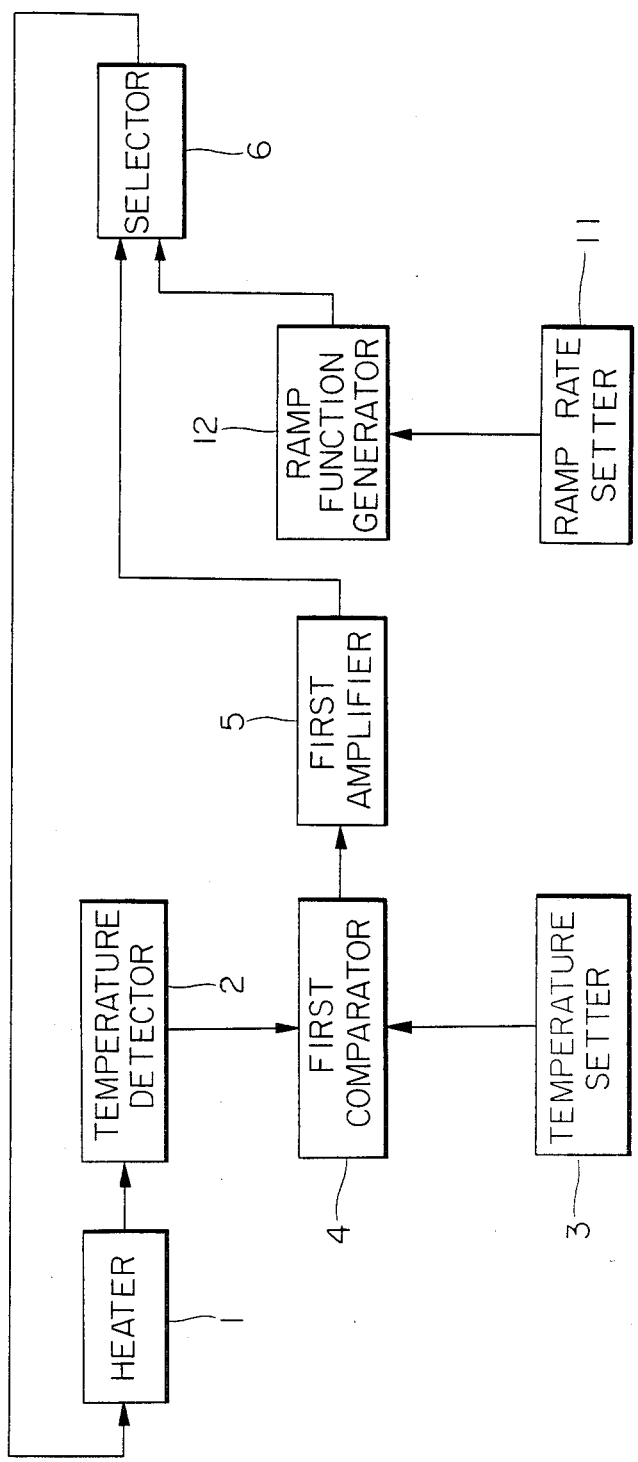
FIG. 3 is a schematic block diagram of a temperature control apparatus according to another embodiment of the present invention.

FIG. 3 is a schematic block diagram of a temperature control apparatus according to another embodiment of the present invention. The circuit shown in FIG. 3 is substantially the same as that shown in FIGS. 1 and 2, except that a ramp rate setter 11 and a ramp function generator 12 are arranged in place of the temperature rise rate setter and the temperature rise rate detector. For this reason, the temperature rise rate of the heater is limited by power (voltage or current) determined in accordance with the ramp function in the early stage of heater operation. The circuit shown in FIG. 3 can be easily arranged as compared with the circuit arrangement shown in FIGS. 1 and 2.

Figure 4:
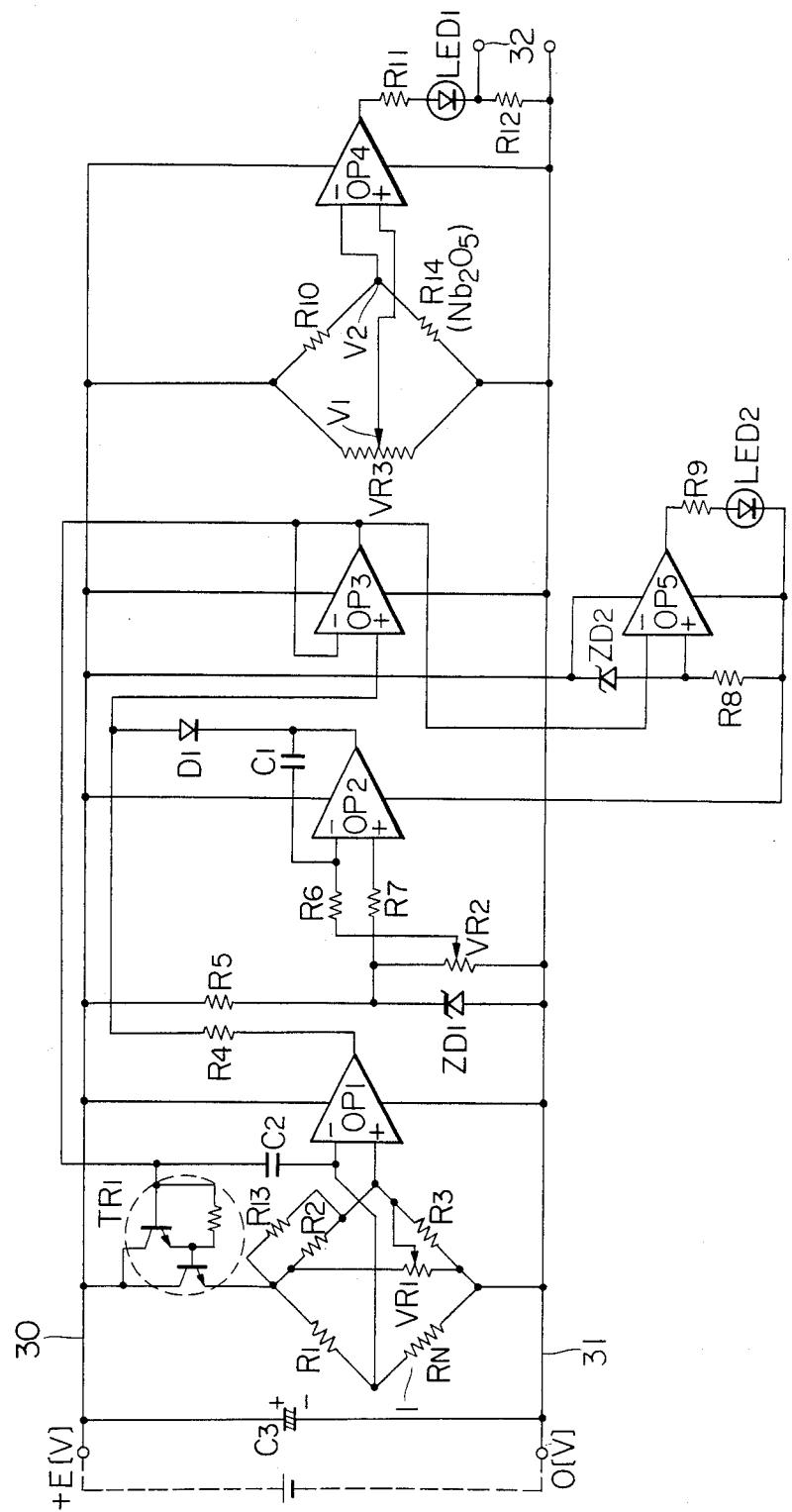
FIG. 4 is a detailed circuit diagram of the temperature control apparatus shown in FIG. 3.

FIG. 4 is a circuit diagram of the apparatus shown in FIG. 3. The apparatus is applied to an $Nb_2O_5$ (niobium pentoxide) oxygen sensor.

Referring to FIG. 4, a Wheatstone bridge which comprises a heater 1 at one of the sides thereof, resistors $R_1$, $R_2$ and $R_3$ and a variable resistor $VR_1$ serves for both heating and temperature detection. One stationary end of the variable resistor $VR_1$ is connected to a connecting point between the resistors $R_1$ and $R_2$, the other stationary end thereof is connected to a connecting point between the resistor $R_3$ and the heater 1, and a slider or movable contact thereof is connected to a connecting point between the resistors $R_2$ and $R_3$. A resistor $R_{13}$ is connected in parallel with the resistor $R_2$. The connecting point between the resistor $R_1$ and the heater 1 is connected to the inverting input of an operational amplifier $OP_1$. The connecting point between the resistors $R_2$ and $R_3$ is connected to the noninverting input of the operational amplifier $OP_1$. The output of the operational amplifier $OP_1$ is connected to the anode of a diode $D_1$ through a resistor $R_4$ and also to the noninverting input of an operational amplifier $OP_3$. The cathode of the diode $D_1$ is connected to the output of an operational amplifier $OP_2$. The output of the operational amplifier $OP_3$ is fed back to the inverting input thereof. The output of the operational amplifier $OP_3$ is also connected to the inverting input of an operational amplifier $OP_5$ and the bases of the transistors of a Darlington transistor circuit $TR_1$. The Darlington transistor circuit $TR_1$ comprises two npn power transistors. The collectors of the transistors are commonly connected to a positive power supply line 30, and the emitter of the transistor at the gain stage is connected to the connecting point between the resistors $R_1$ and $R_2$. The connecting point between the heater 1 and the resistor $R_3$ is connected to a ground line 31 (0 V).

One end of a resistor $R_5$ is connected to the positive power supply line 30, and the other end thereof is connected to the cathode of a Zener diode $ZD_1$. The anode of the Zener diode $ZD_1$ is connected to the ground line 31. A variable resistor $VR_2$ is connected to the two ends of the Zener diode $ZD_1$. The cathode of the Zener diode $ZD_1$ is connected to the noninverting input of the operational amplifier $OP_2$ through a resistor $R_7$. A slider of the variable resistor $VR_2$ is connected to the inverting input of the operational amplifier $OP_2$ through a resistor $R_6$. The output of the operational amplifier $OP_2$ is connected to the inverting input thereof through a capacitor $C_1$. A capacitor $C_2$ is connected between the base of the transistor at the input stage of the Darlington transistor circuit $TR_1$ and the inverting input of the operational amplifier $OP_1$.

The cathode of a Zener diode $ZD_2$ is connected to the positive power supply line 30, and the anode thereof is connected to one end of a resistor $R_8$. The connecting point between the anode of the Zener diode $ZD_2$ and the resistor $R_8$ is connected to the noninverting input of the operational amplifier $OP_5$. The other end of the resistor $R_8$ is connected to the ground line 31. A light-emitting diode $LED_2$ is connected to the output of the operational amplifier $OP_5$ through a resistor $R_9$.

The temperature control apparatus has the arrangement described above. The detector of the oxygen sensor has an arrangement as described below.

A Wheatstone bridge is constituted by a resistor $R_{10}$, a variable resistor $VR_3$, and an $Nb_2O_5$ sensor $R_{14}$. The connecting point between the variable resistor $VR_3$ and the resistor $R_{10}$ is connected to the positive power supply line 30. The connecting point between the variable resistor $VR_3$ and the sensor $R_{14}$ is connected to the ground line 31. A slider of the variable resistor $VR_3$ is connected to the noninverting input of an operational amplifier $OP_4$. The connecting point between the resistor $R_{10}$ and the sensor $R_{14}$ is connected to the inverting input of the operational amplifier $OP_4$. The output of the operational amplifier $OP_4$ is connected to a series circuit of a resistor $R_{11}$, a light-emitting diode $LED_1$ and a resistor $R_{12}$. The connecting point between the light-emitting diode $LED_1$ and the resistor $R_{12}$ is connected to the output terminal of the temperature control apparatus.

The operation of the circuit having the above arrangement will be described hereinafter.

A temperature is detected by a voltage divided by the resistance of the resistor $R_1$ and a heater resistance $R_N$. The voltage dividing section corresponds to the temperature detector in FIG. 3 as well as to that in FIGS. 1 and 2. A voltage is divided by the variable resistor $VR_1$, a parallel circuit of the resistors $R_{13}$ and $R_2$, and the resistor $R_3$, so as to set a target temperature. This voltage dividing section corresponds to the temperature setter in FIG. 3 as well as to that in FIGS. 1 and 2. The operational amplifier $OP_1$ serves to amplify a difference between the voltages from the temperature detector and the temperature setter. The operational amplifier $OP_1$ corresponds to the first comparator and first amplifier in FIG. 3 as well as to those in FIGS. 1 and 2. Even if the positive power supply varies due to voltage division by the resistor $R_5$ and the Zener diode $ZD_1$, a predetermined voltage appears across the two ends of the Zener diode $ZD_1$. This predetermined voltage is divided by the variable resistor $VR_2$, and the divided voltage is applied to the resistor $R_6$. A current flowing through the resistor $R_6$ charges the capacitor $C_1$, thereby generating a ramp function signal. If the output voltage from the operational amplifier $OP_1$ is higher than that from the operational amplifier $OP_2$, a current flows through the diode $D_1$ so as to decrease a voltage at the anode of the diode $D_1$. However, if the output voltage from the operational amplifier $OP_1$ is lower than that from the operational amplifier $OP_2$, a current does not flow in the diode $D_1$, so that the output voltage from the operational amplifier $OP_1$ becomes substantially equal to that at the anode of the diode $D_1$. Since the output of the operational amplifier $OP_3$ is connected to the inverting input thereof for negative feedback, the output voltage becomes equal to the input voltage at the noninverting input thereof, thus serving as a current amplifier. A section which comprises the capacitor $C_1$, the resistor $R_6$, the variable resistor $VR_2$ and the Zener diode $ZD_1$ corresponds to the ramp rate setter in FIG. 3. The operational amplifier $OP_2$ corresponds to the ramp function generator in FIG. 3. The diode $D_1$ compares the output signal from the operational amplifier $OP_1$ serving as the first comparator/amplifier with the output signal from the operational amplifier $OP_2$ serving as the ramp function generator. If the output signal from the operational amplifier $OP_2$ is smaller than that from the operational amplifier $OP_1$, the output signal from the operational amplifier $OP_2$ is produced from the diode $D_1$. Therefore, the diode $D_1$ corresponds to the selector shown in FIG. 3.

If the electric resistance of the heater has a positive temperature coefficient, an increase in heater voltage is proportional to an increase in electric resistance of the heater. For this reason, the Wheatstone bridge which includes the heater 1, the operational amplifiers $OP_1$ and $OP_2$, and the Darlington transistor circuit $TR_1$, together constitute a negative feedback circuit. When a difference between the voltage division ratio at the left half of the Wheatstone bridge and that at the right half thereof becomes equal to a reciprocal of a gain of the circuit as a whole, the bridge is balanced to achieve the normal operating condition. The gain of the operational amplifier may be as high as $10^4$ to $10^8$, so that its reciprocal may be as small as $10^{-4}$ to $10^{-8}$. This value can be neglected. Therefore, the negative feedback circuit serves to keep the electric resistance of the heater 1 at a predetermined value. The electric resistance of the heater 1 is temperature dependent, so that the heater temperature can be kept at a predetermined value, thereby providing a highly reliable termperature control function.

The electric resistance of the heater is very low in the early stage of heater operation. An input signal to the inverting input of the operational amplifier $OP_1$ is smaller than that to the noninverting input thereof, so that the operational amplifier $OP_1$ produces a considerably high output signal. If the operational amplifier $OP_2$ as the ramp function generator is omitted, the large output signal from the operational amplifier $OP_2$ is supplied to the Darlington transistor circuit $TR_1$. A large current flows in the Wheatstone bridge, so that the heater 1 is abruptly heated. As a result, the sensor being heated by the heater could be damaged. However, since the operational amplifier $OP_2$ as the ramp function generator is present, and the output from the operational amplifier $OP_2$ is gradually increased in accordance with charging of the capacitor $C_1$ in the early stage of heater operation, the diode $D_1$ is turned on. The output signal from the operational amplifier $OP_2$ is supplied to control the Darlington transistor circuit $TR_1$ through the operational amplifier $OP_3$. An abrupt increase in heater temperature is thus prevented.

The power supplied to the heater properly corresponds to the heater temperature in a low frequency range. However, when the frequency is increased, the power does not properly correspond to the heater temperature. As a result, the negative feedback function cannot be maintained. At a high frequency, a positive feedback function is set to cause spurious oscillation, due to a phase delay upon operation of the transistors or the like. In order to eliminate spurious oscillation, the capacitor $C_2$ is arranged in the apparatus. The capacitor $C_2$ serves to decrease an impedance as the frequency of the input power is increased, thereby increasing the negative feedback gain and preventing spurious oscillation. As a result, the circuit as a whole is stably operated.

A capacitor $C_3$ serves to decrease an impedance of the power supply line 30 when a high-frequency power is supplied to the circuit. If the impedance of the positive power supply line 30 is high, undesirable coupling occurs through the power supply line 30, thereby producing a positive feedback and hence spurious oscillation. It should be noted that the capacitor $C_3$ may be omitted when a high-frequency power supply is used which has a low impedance.

The operational amplifier $OP_5$ determines whether or not the temperature control section which constitutes the negative feedback amplifier is properly operated. More specifically, if the output voltages from the operational amplifiers $OP_1$ and $OP_3$ and the emitter voltages of the transistors of the Darlington transistor circuit $TR_1$ fall within a normal operating range (generally, the power supply voltage $\pm 2$ V), the output voltage from the operational amplifier $OP_5$ comes close to the power supply voltage, so that the light-emitting diode $LED_2$ goes on so as to indicate normal operation.

If heat from the heater is increased or the power supply voltage is decreased, so that the heater temperature cannot be kept at the predetermined temperature, the voltage at the operational amplifier $OP_3$ becomes higher than that at the connecting point between the Zener diode $ZD_2$ and the resistor $R_8$. The output voltage from the operational amplifier $OP_5$ comes close to zero, thereby turning off the light-emitting diode $LED_2$ and hence signalling abnormal operation. On the other hand, the power supply voltage is too high, power consumption of the Darlington transistor circuit $TR_1$ is increased, resulting in power loss and abnormal temperature rise due to excessive heat dissipation. Therefore, the power supply voltage may only be preset to be a voltage which, upon being applied, is sufficient to turn on at least the light-emitting diode $LED_2$. As a result, proper operation is assured and power loss can be minimized, resulting in convenience.

The operation of the oxygen sensor will be described. Assume that the resistance of the $Nb_2O_5$ sensor is $R_{14}$, the positive power supply voltage is E, a voltage at the slider of the variable resistor $VR_3$ is $V_1$, and a voltage at the connecting point between the resistors $R_{10}$ and $R_{14}$ is $V_2$. When the voltage $V_1$ is higher than the voltage $V_2$, the output voltage from the operational amplifier $OP_4$ comes close to the power supply voltage E. However, when the voltage $V_1$ is lower than the voltage $V_2$, the output voltage from the operational amplifier $OP_4$ is substantially the ground potential. The resistors $R_{11}$ and $R_{12}$ divide the output voltage from the operational amplifier $OP_4$. If a resistance of the variable resistor $VR_3$ is set to be $R_{VR3}$, and a resistance between the slider of the variable resistor $VR_3$ and ground is set to be $R'_{VR3}$, the voltages $V_1$ and $V_2$ are given as follows:

$$V_1 = E(R'_{VR3}/R_{VR3})$$

$$V_2 = E\{R_{14}/(R_{14}+R_{10})\}$$

When the condition $V_1 > V_2$ is given, the output voltage from the operational amplifier $OP_4$ becomes substantially equal to the positive power supply voltage E, so that the following inequality is given:

$$E(R'_{VR3}/R_{VR3}) > E\{R_{14}/(R_{14}+R_{10})\}$$

Since the $Nb_2O_5$ sensor is operated at a low electric resistance at a "rich" air-fuel mixture and at a high electric resistance at a "lean" air-fuel mixture. Therefore, when the resistance of the resistor $R_{10}$ and the resistance $R'_{VR3}$ are properly selected, the condition $V_1 > V_2$ is satisfied in the rich mixture and the condition $V_1 < V_2$ is satisfied in the lean mixture. In the rich mixture, a voltage $V_{R12}$ across the resistor $R_{12}$ is given as follows:

$$V_{R12} \approx E\{R_{12}/(R_{11}+R_{12})\}$$

In the lean mixture, the voltage $V_{R12}$ is given as follows:

$$V_{R12} \approx 0$$

As a result, the output signal can be obtained in the same manner as in an oxygen concentration type oxygen sensor. The light-emitting diode $LED_1$ goes on in the rich mixture.

Figure 5:
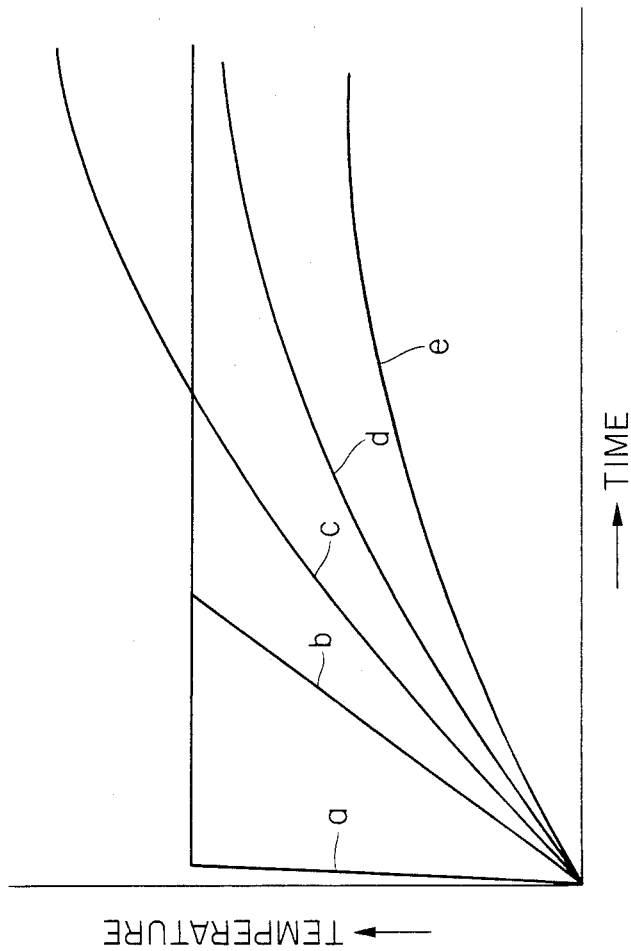
FIG. 5 is a graph showing the temperature rise characteristics in early stages of heater operation for heaters of the present invention and of the prior art.

FIG. 5 is a graph showing the heater temperature rise characteristics at the early stage of heater operation in the heater of the present invention and the conventional heater. Time is plotted along the axis of abscissa, and temperature is plotted along the axis of ordinate.

When the sensor is heated at a constant voltage without performing constant temperature control, it takes a long period of time for the sensor temperature to reach the target temperature as indicated by curves c, d and e. Therefore, the sensor cannot be immediately started. If the heat dissipation conditions are not good, the sensor temperature is abruptly increased as indicated by curve c. However, if heat dissipation is excessively performed due to excessive air blowing around the sensor, the temperature is undesirably lowered as indicated by curve e. On the other hand, if conventional heating is performed to keep the sensor temperature constant, the temperature rise as a function of time is achieved as indicated by curve a. However, in this case, the temperature rise rate is too high, and the sensor tends to be degraded.

According to the temperature control apparatus, the temperature rise is achieved as indicated by curve b. Therefore, the degradation of the sensor is eliminated, and the sensor temperature can reach the target temperature within a short period of time. Therefore, when the present invention is applied to control the engine, the air-fuel ratio can be controlled immediately after the engine is started, resulting in convenience. As a result, significant improvements are made in requirements for fuel consumption and exhaust gas emission.

What is claimed is:

1. A temperature control apparatus for and oxygen sensor, comprising:

a substrate having upper and lower major surfaces;

an oxygen sensor including a gas sensor arranged on one of said major surfaces;

a heater having a heating resistance on the other of said major surfaces;

a Wheatstone bridge having four sides and having the heating resistance of said heater in one said side thereof and resistances in the remaining three sides to achieve a voltage balance to set a target temperature when said oxygen sensor reaches a predetermined temperature, said Wheatstone bridge serving as a temperature setting means and being adapted to produce an output voltage;

a differential amplifier coupled to said Wheatstone bridge for amplifying the output voltage from said Wheatstone bridge;

ramp rate setting means for setting a voltage rise rate;

ramp function generating means coupled to said ramp rate setting means for generating a low voltage output when said power is turned on and for gradually increasing the voltage output therefrom in accordance with the voltage rise rate set by said ramp rate setting means linearly as a function of time after the power is turned on;

selecting means coupled to said differential amplifier and to said ramp function generating means for selecting the smaller of the output voltage from said differential amplifier and the output voltage from said ramp function generating means and for producing a selected voltage; and supply power control means coupled to said selecting means for controlling power to be supplied to said Wheatstone bridge in accordance with the voltage output of said selecting means.

2. An apparatus according to claim 1, wherein said supply power control means comprises a power transistor, a collector of which is connected to one end of a power supply, an emitter of which is connected to one end of said series circuit, and a base of which is connected to an output end of said differential amplifier.

3. An apparatus according to claim 1, wherein said ramp rate setting means comprises a series circuit of a resistor and a capacitor having a connecting point therebetween.

4. An apparatus according to claim 3, wherein said ramp function generating means comprises an operational amplifier including an input end connected to the connecting point between said resistor and said capacitor of said series circuit, said ramp function generating means being adapted to produce a voltage corresponding to a charging voltage appearing across said capacitor when power is supplied to charge said capacitor.

5. An apparatus according to claim 1, wherein said selecting means comprises a diode connected between said first comparing means and said ramp function generating means.

* * * * *